A. SCHAUMBURG.
FRUIT JAR HOLDER.
APPLICATION FILED FEB. 24, 1910.
995,486.
Patented June 20, 1911.
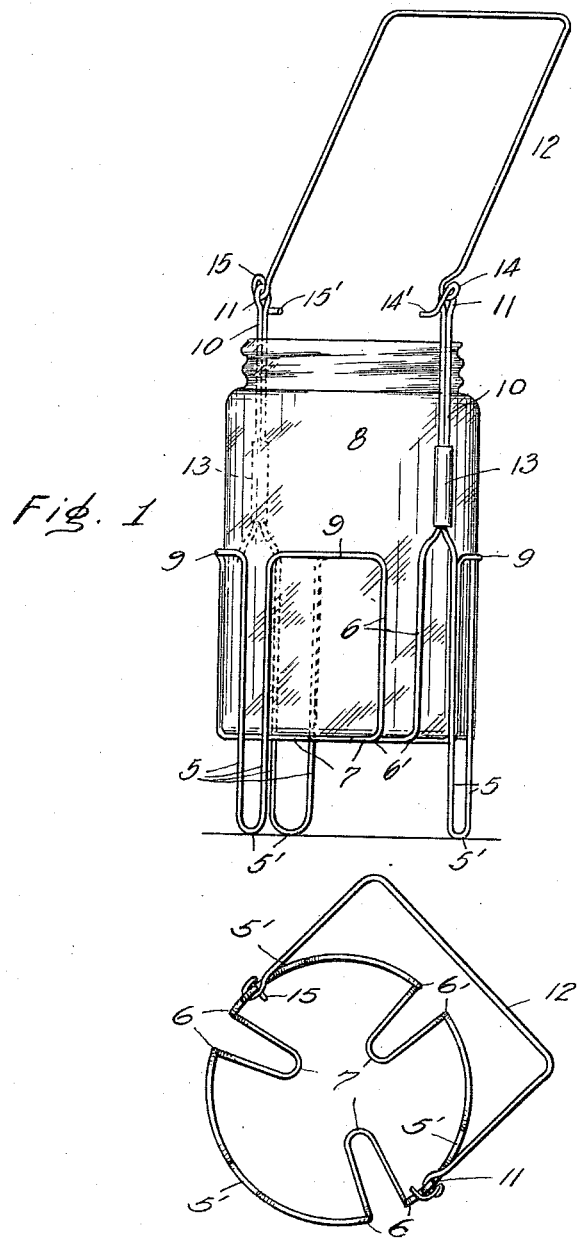
WITNESSES:
H. Barnes.
E. Peterson
INVENTOR
Anna Schaumburg
BY
Pierre Barnes
ATTORNEY

UNITED STATES PATENT OFFICE.

ANNA SCHAUMBURG, OF OLALLA, WASHINGTON.

FRUIT-JAR HOLDER.

995,486. Specification of Letters Patent. Patented June 20, 1911.

Application filed February 24, 1910. Serial No. 545,688.

*To all whom it may concern:*

Be it known that I, ANNA SCHAUMBURG, a citizen of the United States, residing at Olalla, in the county of Kitsap and State of Washington, have invented certain new and useful Improvements in Fruit-Jar Holders, of which the following is a specification.

My invention relates to holders for glass fruit jars; and has for its object the provision of a simple and inexpensive domestic device for conveniently manipulating said jars when sterilizing or preserving fruit, vegetables, or the like, by the various processes where heat is employed.

A well known method of canning fruit and vegetables is by inserting them into glass jars in a raw state and to thus thoroughly cook them by placing the jars in a covered vessel containing a small amount of water which is caused to boil rapidly and to generate a hot vapor that effectively sterilizes the contents of the jars, whereupon the latter in the case of fruit, are filled with a sugar syrup and tightly sealed. It has been found that the chief difficulty attendant upon the said method resides in the frequent breakage of the jars caused by setting the latter upon the vessel's bottom where the ebullition of the rapidly boiling water jostles the jars one with another often causing damage. Also the differences in temperature about the jars is a frequent source of loss, as the jar resting directly upon the vessel's bottom tends to cause an excessive accumulation of heat thereunder. The above difficulties have been partially overcome in the past by the employment of strips of wood laid directly upon the vessel bottom or by a layer of straw or the like, to afford means to equalize the temperature.

To overcome the above stated and other objections, I provide a device that retains the jar above the bottom of the steam-vessel sufficiently to insure an equality of temperature thereabout; that affords a yieldable shield about the jar to guard against giving or receiving shocks likely to cause damage; and wherewith is provided a means to place or withdraw the jars from the hot steam chamber without personal discomfort or risk of loss of contents of the jars.

With the above and other objects in view, my invention consists in the novel construction, adaptation and combination of parts, as will be hereinafter described and claimed.

In the drawings, Figure 1 is an elevational view of an embodiment of my invention. Fig. 2 is a top plan view of the same.

The device is preferably formed of wire as giving the lighter construction and one more readily accessible to the hot liquids and vapors to which exposed; however, a stamped metal structure would accomplish all the functions of the specific embodiment herewith shown and described and I particularly state that I desire to protect all equivalents of such a nature or that may fall within the scope of the invention as claimed.

Referring to said drawings, the holder is formed of wire which is bent in vertical directions to afford a plurality of doubled portions 5 and 6. Said doubled portions of the wire are respectively disposed alternately and symmetrically and comprise a circular frame of which the former 5 extends downwardly and terminates in a common horizontal plane in rounded lower ends 5' to afford supporting legs, at least three in number, to the structure. The doubled portions 6 are bent inwardly at 6' in radial directions and in a horizontal plane to provide supports 7 for a jar 8. Intermediately connecting the respective portions 5 and 6 at the top, excepting as hereinafter stated, the wire is bent in horizontal directions as at 9 and thereat is offset outwardly from the circular plane in which extend the said vertical doubled portions to safeguard the jar held thereon against contact with objects likely to injure same. Upon opposite sides of the holder, in each case intermediate two of the doubled portions 5 and 6 the wire is extended upwardly at 10 and terminates in a loop 11. The extensions 10 are adapted to afford means for connection with a bail 12 and are each provided with a tubular metal clip 13 which serves to reinforce and lend them rigidity. Said bail is formed of wire and its ends 14 and 15 are hingedly connected to the respective ends of said loops 11 by being threaded through the latter and are bent to provide interfering extremities 14' and 15' one upon either side to limit the amount of vibratile movement in the bail. It is desirable that the bail be constantly in an elevated position to be readily grasped and to prevent its becoming overheated and also desirable that it swing to a limited distance to either side to allow of the convenient manipulation of the jar and the care of its contents.

The device is employed by placing a glass or other jar in the receptacle formed by said circular frame and the bottom supports 7. The jar may then be lifted by the bail 12 into the cooking vessel where it may receive a high degree of heat without danger of breakage as the jar is elevated above the bottom of the vessel and the heat thereby equally distributed about the exterior of the jar. The jar is also protected from collision with other like jars by the wire frame surrounding it and particularly by the offset portions 9 of the frame.

The jar holders described are of inexpensive construction and are desirably employed in quantities sufficient to utilize all the space available in the vessel in which the cooking is accomplished.

Having described my invention, what I claim, is—

A circular wire frame comprising pairs of vertically disposed parallel spaced members 5—5 and 6—6, the pairs of members 5—5 and 6—6 being spaced from each other and the members of each pair 5—5 and 6—6 connected together at their lower ends by a rounded portion, each of said pairs of members 6—6 having an inwardly-extending angularly disposed lower portion forming the bottom of the frame and the lower portion of each pair of members 5—5 constituting supports for the frame, certain of the members of the pairs of members 5—5 at their tops connected to certain of the members of the pairs of members 6—6 by segment-shaped off-set members and the other of said members of said pairs of members 5—5 connected to the other of said members of the pairs of members 6—6 by upright members projecting above said off-set members, said upright members arranged in pairs and the members of each pair connected together at their tops, and a bail attached to the upper end of said upright members.

ANNA SCHAUMBURG.

Witnesses:
H. BARNES,
A. B. SMITH.

---

Copies of this patent may be obtained for five cents each, by addressing the "Commissioner of Patents, Washington, D. C."